United States Patent [19]

Freis et al.

[11] 3,728,387

[45] Apr. 17, 1973

[54] ACRYLAMIDE OF METHACRYLAMIDE MONOMER WITH N-SUBSTITUTED AMININMIDE RESIDUES

[75] Inventors: Richard E. Freis, Bloomington, Minn.; Billy M. Culbertson, Worthington, Ohio

[73] Assignee: Ashland Oil, Inc., Columbus, Ohio

[22] Filed: Mar. 17, 1972

[21] Appl. No.: 235,814

[52] U.S. Cl........260/561 H, 260/80.73, 260/86.1 N, 260/88.1 PN, 260/89.7 R, 260/471 A, 260/482 R, 260/562 H
[51] Int. Cl............................................C07c 103/30
[58] Field of Search........................260/561 H, 562 H

[56] References Cited

FOREIGN PATENTS OR APPLICATIONS 232,117   1/1959   Australia..........................260/561 H Primary Examiner—Lewis Gotts
Assistant Examiner—Ethel G. Love
Attorney—Walter H. Schneider et al.

[57] ABSTRACT

N-substituted acryl- and methacrylamides are disclosed which compounds as a class are structurally characterized in having an amido substituent in the form of a methylene or polymethylene radical terminally containing a quaternary ammonium acylimine group. These vinyl aminimide monomers can be homo- or copolymerized to provide either linear thermosetting polymers or linear polymers from whence thermoset cross-links can be derived, all having recognized utility in a variety of coating applications.

10 Claims, No Drawings

ACRYLAMIDE OF METHACRYLAMIDE MONOMER WITH N-SUBSTITUTED AMININMIDE RESIDUES

BACKGROUND OF THE INVENTION

1. Field Of The Invention

This invention relates to N-substituted acryl- and methacrylamides.

2. Description Of The Prior Art

Certain vinyl aminimides have heretofore been proposed for preparing linear addition polymerization products containing a plurality of pendant aminimide groups attached to secondary or tertiary carbon atoms of the polymer backbone. It is further known that the aminimide grouping; i.e., the

structure, can be thermally rearranged to provide the isocyanate radical accompanied by the formation of a tertiary amine leaving group. Thus in the practice of the foregoing prior art addition polymers can be obtained having multiple isocyanate functionality which polymers find widespread use in the surface coating arts in general and in other specialized applications such as the modification of wool, cellulosic and like substrates. U.S. Pat. Nos. 3,485,806 and 3,527,802 are especially exemplary of the polyaminimides referred to.

As indicated, the vinyl aminimides exemplified in the aforesaid patents lead to the formation of polyisocyanates wherein the isocyanate groups are partially or completely hindered. In view of the fact that steric hindering of an isocyanate group is usually a significant factor in adversely affecting the reactivity rate thereof, an important need is indicated for acrylic type aminimide monomers which are capable of yielding polyisocyanates having 1° isocyanate functionality.

SUMMARY OF THE INVENTION

In accordance with the present invention, a class of vinyl aminimides are provided having the following structural formula:

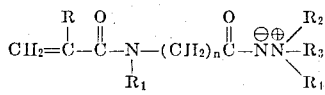

wherein R represents H or CH₃; R₁ represents H, alkyl, aryl, aralkyl or cyclohydrocarbyl; R₂, R₃ and R₄ are selected from the group consisting of alkyl and hydroxyl alkyl; and n is an integer of from 1-4 inclusive.

Most of the monomers structurally depicted above will readily homo-polymerize and without exception all will copolymerize with the conventional vinyl or vinylidene monomers employed in obtaining linear addition polymerization products. Inasmuch as certain of the vinyl aminimide monomers contemplated herein inherently contain active hydrogen atoms, these monomers are capable of providing homo- and copolymers which will, per se, undergo curing to a thermoset condition upon heating above about 150°C. in the course of effecting the initial rearrangement of the aminimide groups thereof to isocyanate groups. With respect to the N, N-disubstituted type monomers contemplated herein, the homo and the copolymers thereof can be combined with cross-linking agents containing a plurality of active hydrogen atoms so as to realize thermoset products upon effecting the indicated rearrangement.

The salient feature of the novel monomers of this invention resides in that the homo- and copolymers thereof can provide primary polyisocyanates. Thus the requisite co-reaction to obtain thermoset products from such polyisocyanates can be accomplished without observing prolonged curing cycles and/or the use of a catalyst.

DESCRIPTION OF THE PREFERRED EMBODIMENTS

In deriving the N-substituted acryl- and methacrylamide monomers of this invention, two procedures are applicable, each involving two steps. One applicable procedure consists of acylating an amino or N-substituted amino acid ester and thereupon converting the carboxylate residue to an aminimide group. The alternate procedure referred to, which is particularly suitable for deriving the acrylamide derivatives, consists of first converting the selected amino acid ester to the corresponding aminimide and thereupon acylating the resultant aminimide.

The contemplated acylating agents include methacrylyl chloride and acrylyl chloride. The applicable amino esters include the alkyl esters of glycine, β - alanine, γ -aminobutyric acid and δ -amino-valeric acid. As indicated herein above, the N-substituted derivatives of the foregoing amino esters are likewise contemplated for use in the practice of this invention. Such a substituent can be alkyl, aryl, aralkyl, or cyclohydrocarbyl. The conditions applicable for carrying out the acylation reaction are well known and need not be detailed here. Moreover, the working examples are fully illustrative of the conventional procedures for effecting this reaction.

Conversion of the ester to the corresponding aminimide, irrespective of whether this step is carried out before or after acylation, can be accomplished following two different general procedures. In one of such procedures, the ester is reacted with a trialkyl hydrazinium halide, preferably the chloride, in the presence of a strong base, e.g., sodium methoxide, to provide the aminimide. Certain of the following working examples are illustrative of this method. However, further details relative to this procedure can be found in Ser. No. 14,668, filed Feb. 26, 1970, now U.S. Pat. No. 3,706,800. An alternate method for deriving the aminimide, which is likewise exemplified in the following examples, consists of reacting the amino ester or the acylated derivative thereof with about an equivalent of each of an unsymmetrical di-(lower) alkyl hydrazine and an alkylene oxide. Further details relative to the latter method are set forth in U.S. Pat. No. 3,485,806.

In order to illustrate the best mode contemplated for carrying out the present invention and a manner of using the same, the following examples are set forth. As indicated, these examples are given primarily by way of illustration and accordingly, any enumeration of details contained therein is not to be construed as a limitation on the invention. The only limitations intended are those expressed in the apended claims. All parts are parts by weight unless otherwise indicated and all temperature values are in term of the centigrade scale.

EXAMPLE I 1,1-Dimethyl-1-(2-hydroxypropyl) amine N-Methacryloylglycinimide

Glycine methyl ester hydrochloride (62.8 g, 0.5 mol) was slurried in 350 ml of diethyl ether containing 58.0 g (0.55 mol) of methacryloylchloride. The solution was cooled to 0.5° and a solution of 140 g of potassium carbonate in 145 ml of water was added dropwise with stirring. Stirring was continued for 1 hr and the two phases separated. The ether solution was dried over anhydrous sodium sulfate, filtered and the ether evaporated in vacuo to give a 79.6 g (92.8 percent) yield of methyl N-methacryloylglycinate (Ia) as a clear, colorless liquid.

Compound Ia, 79.6 g (0.465 mol), unsymmetrical dimethylhydrazine (DMH), 29.5 g (0.491 mol), propylene oxide (PO), 29.3 g (0.505 mol) and 100 ml anhydrous isopropanol were combined and sealed in a pressure bottle. The reaction was exothermic and the solution temperature elevated from 26° to 72°, over a 3 hr period. After the reaction had cooled to room temperature, diethyl ether was added to the reaction product until the solution became cloudy. The ether solution was then held at −17° for 18 hr. White, crystalline product was collected in a 61 g (54 percent) yield, m p 108.5°–111°. The IR spectrum (mineral oil mull) showed the expected absorption bands at 3250, 3125, 1660, 1598 and 1530 cm$^{-1}$. Anal. calcd for $C_{11}H_{21}N_3O_2$: C, 54.30; H, 8.70; N, 17.27. Found: C, 54.54; H, 8.73; N, 16.93.

EXAMPLE II 1,1-Dimethyl-1-(2-hydroxypropyl)amine β -(N-Cyclohexyl-N-methacryloyl) aminopropanimide. A 1 liter three-neck flask was fitted with a thermometer, stirrer, dropping funnel and condenser and charged with 400 ml of diethyl ether, 71 g of triethylamine and 111 g (0.62 mol) of methyl β -cyclohexylaminopropionate. The solution was cooled to −10° and 65 g (0.62 mol) of methacryloyl chloride was added slowly, while keeping the temperature below 15°. Stirring was continued for 1 hr at room temperature. Filtration and evaporation of the ether afforded a 140 g (93 percent) yield of crude methyl β (N-cyclohexyl-N-methacryloyl)aminopropionate (IIa). The product was distilled and the middle cut, 142°/0.2 mm, collected in a 100 g yield, $N_D{}^{22}$ 1.4850, 98.2 percent pure by glc. The IR spectrum showed absorption bands at 1735, 1645 and 1620 cm$^{-1}$. The nmr spectrum (CDCl$_3$) integrated correctly for the expected compound. Anal. calcd for $C_{14}H_{23}NO_3$: C, 66.40; H, 9.09; N, 5.53. Found: C, 65.90; H, 9.01; N, 5.51.

Compound IIa, 25.3 g (0.1 mol) was treated with 6.3 g (0.105 mol) of DMH and 6.09 (0.105 mol) of PO in 30 ml of anhydrous isopropanol in accordance with the procedure described in Example I. After 20 hr at room temperature, the solvent and other volatiles were removed to give a 36 g yield of a highly viscous syrup. The product was rubbed with ethyl acetate/Skelly B (50/50) to obtain a white solid in a 29.5 g (theory, 33.9 g) yield. After recrystallization from ethyl acetate, m.p. 116°–118°, the IR spectrum of the purified product (halocarbon mull) exhibited the expected absorption bands at 3175, 1647, 1620 and 1575 cm.$^{-1}$ Anal. calcd for $C_{18}H_{33}N_3O_3$: C, 63.71; H, 9.73; N, 12.39. Found: C, 63.50; H, 9.68; N, 12.30.

EXAMPLE III 1,1,1-Trimethylamine β (N-Cyclohexyl-N-methacryloyl)amino-propanimide. Compound IIa of Example II in the amount of 50.6 g (0.2 mol) was treated with 22.1 g (0.2 mol) of trimethyl hydrazinium chloride and 4.4 g (0.2 mol) of sodium methoxide in 150 ml of anhydrous isopropanol. After stirring overnight at 55°, the solution was cooled, filtered through filter-aid and the solvent and other volatiles removed to afford a 60 g yield of crude product. After recrystallization from acetone, m.p. 144°–146°, the IR spectrum of the purified product showed absorption bands at 1647, 1615 and 1580 cm.$^{-1}$ The nmr spectrum (CDCl$_3$) integrated correctly for the expected product. Anal. calcd for $C_{16}H_{29}N_3O_2$: C, 65.05; H, 9.89; N, 14.22. Found: C, 64.73; H, 9.99; N, 13.89.

EXAMPLE IV 1,1-Dimethyl-1-(2-hydroxypropyl)amine β (N-Cyclohexyl-N-acryloyl)aminopropanimide. Methyl β -(N-cyclohexyl)aminopropanate, 18.5 g (0.1 mol), was treated with acryloyl chloride, 9.0 g (0.1 mol), in cold tetrahydrofuran solution containing 12.5 g (0.1 mol) of triethylamine. Filtration, evaporation of the solvent and distillation afforded a 15 g (65%) yield of clear, colorless methyl β (N-cyclohexyl-N-acryloyl)aminopropanate (IVa), b.p. 148° (0.3 mm), 97 percent pure by glc. The IR spectrum exhibited characteristic absorption bands at 1738, 1645 and 1612 cm$^{-1}$ and the nmr spectrum (CDCl$_3$) integrated correctly for IVa. Anal. calcd for $C_{13}H_{21}NO_3$: C, 65.27; H, 8.78; N, 5.86. Found: C, 64.83; H, 8.89; N, 5.85.

Compound IVa in the amount of 14.0 g (0.1 mol), 3.6 g (0.1 mol) of DMH, 3.5 g (0.1 mol) of PO and 20 ml of isopropanol were combined and sealed in a pressure bottle. After 24 hr at room temperature, the solvent was evaporated to give a quantitive yield of yellow, viscous oil. The IR spectrum, with a weak band at 1725 cm$^{-1}$, indicated not all the ester group converted to aminimide. After several ether washings, the IR spectrum of the oil showed no ester absorption band.

EXAMPLE V 1,1-Dimethyl-1-(2-hydroxypropyl)amine β -[N-(n-butyl)-N-methacryloyl] aminopropanimide. Following the procedure outlined in the previous examples, methyl β (n-butyl)aminopropionate, 79.5 g (0.5 mol) was reacted with methacryloyl chloride, 52.7 g (0.5 mol) in 350 ml ethyl ether, containing 51 g of triethylamine. Crude methyl β -[N-(n-butyl)-N-methacryloyl] aminopropionate was distilled to give a 39 g (35 percent) yield of Va as a clear, colorless liquid, b.p. 101–103 (0.04 mm), 97.7 percent pure by glc. The IR spectrum exhibited characteristic absorption bands at 1740 1650 and 1630 cm$^{-1}$ and the nmr spectrum (CDCl$_3$) integrated correctly for the indicated product. Anal. calcd for $C_{12}H_{21}NO_3$: C, 63.50; H, 9.27; N, 6.16. Found: C, 62.50; H, 9.22; N, 6.42.

Compound Va, 11.36 g (0.05 mol), PO, 3.2 g (0.055 mol), DMH, 3.3 g (0.055 mol), and 12 ml isopropanol were combined in a pressure bottle. After 48 hrs. at room temperature, the solvent and other volatiles were removed to give a quantitive yield of product as a very viscous oil. Tlc indicated the compound had several impurities. The IR spectrum (smear) exhibited characteristic absorption bands at 3250, 3180, 1650, 1630 and 1580 cm$^{-1}$ and the nmr spectrum (CDCl$_3$) integrated good for the expected product. Anal. calcd for C$_{16}$H$_{31}$NO$_3$: C, 61.31; H, 9.97; N, 13.41. Found: C, 59.31; H, 10.16; N, 13.76.

EXAMPLE VI 1, 1-Dimethyl-1-(2-hydroxypropyl)amine β (N-Phenyl-N-methacryloyl)aminopropanimide. Methyl β (N-phenyl)aminopropionate, 89.6 g (0.5 mol), was reacted with 49.5 g (0.5 mol) of methacryloyl chloride in 350 ml ether containing 51 g triethylamine. After distillation, (VIa) was obtained in a 109 g (88 percent) yield as a clear, colorless liquid, b.p. 130° (0.06 mm), 98 percent pure by glc. Anal. calcd for C$_{14}$H$_{17}$NO$_3$: C, 68.01; H, 6.88; n, 5.66. Found: C, 67.85; H, 6.81; N, 5.60.

Compound VIa in the amount of 24.7 g (0.1 mol) was reacted with 5.8 g (0.1 mol) of PO and 6.0 g (0.1 mol) of DMH in 90 ml of isopropanol for 24 hr at room temperature. Evaporation of the solvent and other volatiles afforded ca. a quantitative yield of aminimide product as a very viscous oil. Tlc indicated the product to have trace amounts of several impurities. The IR spectrum exhibited characteristic absorption bands at 3175, 1650, 1630, 1600 and 1575 cm.$^{-1}$ The nmr spectrum (CDCl$_3$) showed the presence of some impurity but did support the ascribed structure. Anal. calcd for C$_{18}$H$_{27}$NO$_3$: C, 64.86; H, 8.10; N, 12.61. Found: C, 63.89; H, 8.18; N, 12.70.

EXAMPLE VII 1, 1, 1-Trimethylamine β (N-Phenyl-N-Methacryloyl)aminopropanimide. Compound VIa in the amount of 12.37 g (0.05 mol), was reacted with 5.5 g (0.05 mol) of 1, 1, 1-trimethylhydrazinium chloride in 50 ml of anhydrous isopropanol containing 2.7 g (0.05 mol) of sodium methoxide. The crude monomer, obtained in ca. a quantitative yield, was recrystallized from an acetone/methanol (95/5) solvent mixture to obtain white crystalline product m.p. 164°–166°. The IR spectrum exhibited characteristic absorption bands at 1645, 1615, 1607 and 1580 cm.$^{-1}$ Anal. calcd for C$_{16}$H$_{23}$NO$_3$: C, 66.34; H, 7.94; N, 14.51. Found: C, 66.14; H, 8.20; N, 13.87.

EXAMPLE VIII 1, 1, 1-Trimethylamine β (N-Phenyl-N-Acryloyl)-aminopropanimide. 1, 1, 1-trimethylamine β (N-phenyl)aminopropanimide, 20 g (0.09 mol) was reacted with 8.18 g (0.09 mol) of acryloyl chloride in 200 ml cold (<10°) tetrahydrofuran containing 9.16 g (0.09 mol) of triethylamine. After filtration to remove salt and evaporation of volatiles, the crude reaction product was recrystallized frm benzene to obtain a 13.5 g (54 percent) yield of slightly yellow crystals. Recrystallization from ethyl acetate produced a white crystalline material, m.p. 175°–176.5°. Anal. calcd for C$_{15}$H$_{21}$NO$_3$: C, 65.46; H, 7.68; N, 15.25. Found: C, 65.97; H, 7.50; N, 15.44.

EXAMPLE IX 1, 1-Dimethyl-1-(2-hydroxypropyl)amine N-Phenyl-N-methacryloyl-glycinimide. Ethyl N-phenylglycinate, 89.6 g (0.5 mol) was reacted with methacryloyl chloride, 52.25 g (0.5 mol) in 200 ml cold ether containing 60 g of triethylamine following the procedure outlined in the previous examples. Distillation afforded a 135 g (56 percent) yield of product (IXa) as a clear, colorless liquid, b.p. 130° (0.08 mm), 99+% pure by glc. Anal. calcd for C$_{14}$H$_{33}$NO$_3$: C, 68.00; H, 6.93; N, 5.66. Found: C, 67.94; H, 6.83; N, 5.63.

Compound IXa in the amount of 12.3 g (0.05 mol), PO, 3.19 g (0.055 l mol), DMH, 3.30 g (0.055 mol) and 13 ml of isopropanol were combined and sealed in a glass pressure bottle. After 18 hr at room temperature and 1 hr at 70°, the solvent and other volatiles were removed to give a crude aminimide produce in ca. quantitative yield. The product was rubbed with ether and recrystallized from ethyl acetate to obtain white crystals, m p 130°–131°. Anal. calcd for C$_{17}$H$_{25}$N$_3$O$_3$: C, 63.93; H, 7.89; N, 13.16. Found: C, 63.46; H, 7.72; N, 13.14.

EXAMPLE X 1, 1-Dimethyl-1-(2-hydroxypropyl)amine N-Acryloylglycinimide. Glycine methyl ester hydrochloride, 62.8 g (0.5 mol) was reacted with acryloyl chloride, 49.5 g (0.5 mol) in a cold ether-water slurry with the water phase containing 140 g of potassium carbonate. Methyl N-acryloyl-glycinate (Xa) was obtained in a 43 g (54 percent) yield as a clear, colorless liquid. The IR spectrum exhibited characteristic absorption bands at 3290, 1750, 1665, 1635 and 1545 cm $^{-1}$ and the nmr spectrum (CDCl$_3$) integrated correctly for the indicated product.

Compound Xa in the amount of 15.7 g (0.1 mol) was combined with 100 ml anhydrous isopropanol, 6.0 g (0.1 mol) of DMH and 6.0 g (0.1 mol) of PO and sealed in a glass pressure bottle. After 18 hr at room temperature and 4 hr at 40° the solvent and other volatiles were removed to give ca. a quantitative yield of crude product which was recrystallized twice from ethyl acetate and twice from an acetone/ether (50/50) solvent mixture to provide a 5 g yield of white crystalline material, m p 136°–138°. Anal. calcd for C$_{10}$H$_{19}$N$_3$O$_3$: C, 52.40; H, 8.29; N, 18.34. Found: C, 51.44; H, 8.25; N, 18.84.

EXAMPLE XI

This and the succeeding examples are illustrative of a manner for using a representative monomer of the previous examples to prepare thermosetting polymers. The term "thermosetting" is meant to define those polymers capable of providing substantially infusible and insoluble resinous complexes through a cross-linking mechanism occurring during the curing process.

Into a suitable reaction vessel were charged 200 parts of methyl methacrylate, 48.5 parts of the monomer of Example 1, 19.5 parts of isopropanol and 2.0 parts of AIBN (azobisisobutyronitrile) initiator. After a brief nitrogen sparge, the vessel was sealed and polymerization conducted for 3 hours at 70°. The resultant viscous polymeric solution was poured into a large excess of methanol and the precipitated polymer collected. The polymer was dissolved in chloroform which solution was then used to cast films. The infrared spectrum (IR) of the films exhibited absorption bands indicative of amide, ester and aminimide residues. The films became thermoset when heated for 30 minutes at 160°.

EXAMPLE XII

Following the procedure outlined in Example 11, 208 parts of styrene and 48.5 parts of the monomer of Example 1 were copolymerized in 470 parts of ethyl cellulose in the presence of 2.0 parts of AIBN initiator. The polymerization reacton mixture was held at 70° for 8 hours, whereupon the resultant viscous polymeric solution was poured into about 650 parts of Skelly B to precipitate the polymer. The polymer was cooled, washed several times with methanol and air dried to provide an essentially quantitative yield of the modified polystyrene. The IR spectrum of a cast film of the polymer exhibited the expected strong aminimide absorption band. Upon baking films of the polymer for 30 minutes at 160°, the films became thermoset and the IR spectrum thereof showed that the aminimide absorption band vanished during the curing process.

EXAMPLE XIII

Following the procedure outlined in the above examples, 521 parts of styrene, 385 parts of butylacrylate, 116 parts of hydroxyethyl acrylate and 243 parts of the monomer of Example 1 were polymerized in 660 parts of isopropyl alcohol in the presence of 20 parts of AIBN initiator. Copolymerization was carried out for 5 hours at 70°. The resulting viscous solution was cooled and diluted with 330 parts of isopropyl alcohol to provide a solution containing about 50 percent solids. Films cast from the solution exhibited the expected ester, amide, hydroxyl, styrene and aminimide absorption (IR) bands. Films baked on glass plates for 30 minutes at 160° exhibited a Sward of 50, Tukon of 11.9, excellent color, adhesion and solvent resistance.

What is claimed is:

1. A compound of the formula:

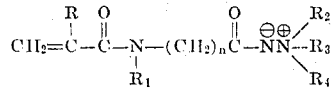

wherein R represents H or $CH_3$; $R_1$ represents H, alkyl, aryl, aralkyl or cyclohydrocarbyl; $R_2$, $R_3$ and $R_4$ are selected from the group consisting of alkyl and hydroxyl alkyl; and n is an integer of from 1–4 inclusive.

2. A compound in accordance with claim 1 wherein R is H.

3. A compound in accordance with claim 2 wherein n is 1 or 2.

4. A compound in accordance with claim 3 wherein $R_2$, $R_3$ and $R_4$ represent lower alkyl.

5. A compound in accordance with claim 3 wherein $R_2$ and $R_3$ each represents $CH_3$ and $R_4$ represents hydroxyl lower alkyl.

6. A compound in accordance with claim 5 wherein $R_4$ represents hydroxy propyl.

7. A compound in accordance wit claim 1 wherein R is $CH_3$.

8. A compound in accordance with claim 7 wherein n is 1 or 2.

9. A compound in accordance with claim 8 wherein $R_2$, $R_3$ and $R_4$ represent lower alkyl.

10. A compound in accordance with claim 9 wherein $R_2$ and $R_3$ each represents $CH_3$ and $R_4$ represents hydroxy lower alkyl.

* * * * *